US011294866B2

(12) United States Patent
Almaraz et al.

(10) Patent No.: US 11,294,866 B2
(45) Date of Patent: Apr. 5, 2022

(54) LAZY OPTIMISTIC CONCURRENCY CONTROL

(71) Applicant: salesforce.com, inc., San Francisco, CA (US)

(72) Inventors: Martin Mario Almaraz, San Francisco, CA (US); Valliappan Annamalai Natarajan, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 309 days.

(21) Appl. No.: 16/564,581

(22) Filed: Sep. 9, 2019

(65) Prior Publication Data

US 2021/0073184 A1 Mar. 11, 2021

(51) Int. Cl.
*G06F 16/176* (2019.01)
*G06F 16/17* (2019.01)
*G06F 16/25* (2019.01)
*G06F 16/11* (2019.01)

(52) U.S. Cl.
CPC ........ *G06F 16/1774* (2019.01); *G06F 16/113* (2019.01); *G06F 16/1734* (2019.01); *G06F 16/258* (2019.01)

(58) Field of Classification Search
CPC .. G06F 16/113; G06F 16/1774; G06F 16/258; G06F 16/1734; G06F 16/2329; G06F 16/2322
USPC .......................................................... 707/704
See application file for complete search history.

(56) References Cited

U.S. PATENT DOCUMENTS

| 7,467,267 | B1* | 12/2008 | Mayock | G06F 11/1464 |
| | | | | 711/162 |
| 8,280,853 | B1* | 10/2012 | Lai | G06F 16/113 |
| | | | | 707/651 |
| 10,216,580 | B1* | 2/2019 | Peleg | G06F 16/258 |
| 10,803,012 | B1* | 10/2020 | Madhavarapu | G06F 16/273 |
| 2002/0161784 | A1* | 10/2002 | Tarenskeen | G06F 16/214 |
| 2005/0149584 | A1* | 7/2005 | Bourbonnais | G06F 16/256 |
| 2014/0025641 | A1* | 1/2014 | Kumarasamy | G06F 16/27 |
| | | | | 707/661 |
| 2016/0179853 | A1* | 6/2016 | Bertin | G06F 16/113 |
| | | | | 707/662 |
| 2016/0253339 | A1* | 9/2016 | Ambrose | G06F 16/113 |
| | | | | 707/693 |

(Continued)

*Primary Examiner* — Shahid A Alam
(74) *Attorney, Agent, or Firm* — Holland & Hart LLP

(57) ABSTRACT

Methods, systems, and devices supporting data storage are described. A database system may implement lazy optimistic concurrency control (LOCC). LOCC may support an efficient use of database connections for a data archiving process. The data archiving process may involve a first worker thread at an application server copying data records from a primary database and writing the data records to a secondary database. A second worker thread may operate concurrent to the first worker thread to monitor the primary database for changes (e.g., using a shared database connection), as the primary database may not lock the copied data records during the archiving process. Data records that are altered in the primary database during the archiving process may be logged for error handling by an administrator. The data records that are copied from the primary database and not altered during the archiving process may be deleted from the primary database.

17 Claims, 12 Drawing Sheets

(56) References Cited

U.S. PATENT DOCUMENTS

2018/0060176 A1\* 3/2018 Thakkar ................ G06F 16/113
2019/0332692 A1\* 10/2019 Rachapudi .............. G06F 16/27

\* cited by examiner

US 11,294,866 B2

LAZY OPTIMISTIC CONCURRENCY CONTROL

FIELD OF TECHNOLOGY

The present disclosure relates generally to database systems and data processing, and more specifically to lazy optimistic concurrency control (LOCC).

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Archiving data in a database system (e.g., a database system handling CRM data) may pose multiple challenges, such as moving data across databases of different ideologies, maintaining communications between separate databases, and handling user interactions with the data records during the archiving process. In some systems, archiving data may involve locking large portions of a database to prevent data inconsistencies based on user inputs. However, this locking procedure may tie up resources (e.g., database connections) for a significant period of time and can lead to poor system performance. Additionally, locking portions of a database may prevent users or processes from accessing the locked data records until the database lock is released, slowing the system performance and degrading the user experience. Archiving data without locking portions of a database may create data inconsistencies. In some cases, one or more data records of a set of data records being archived may be altered during the archiving process. If a data record is modified by a user after the data record is copied for the archiving process, the first database may store the record in its altered state, and the second database may store the record in its unaltered (e.g., original) state. This may result in inconsistencies between the databases, and if the archived data is removed from the first database following the archiving process, the user modification to the data record may be lost.

DETAILED DESCRIPTION

Figure 1:
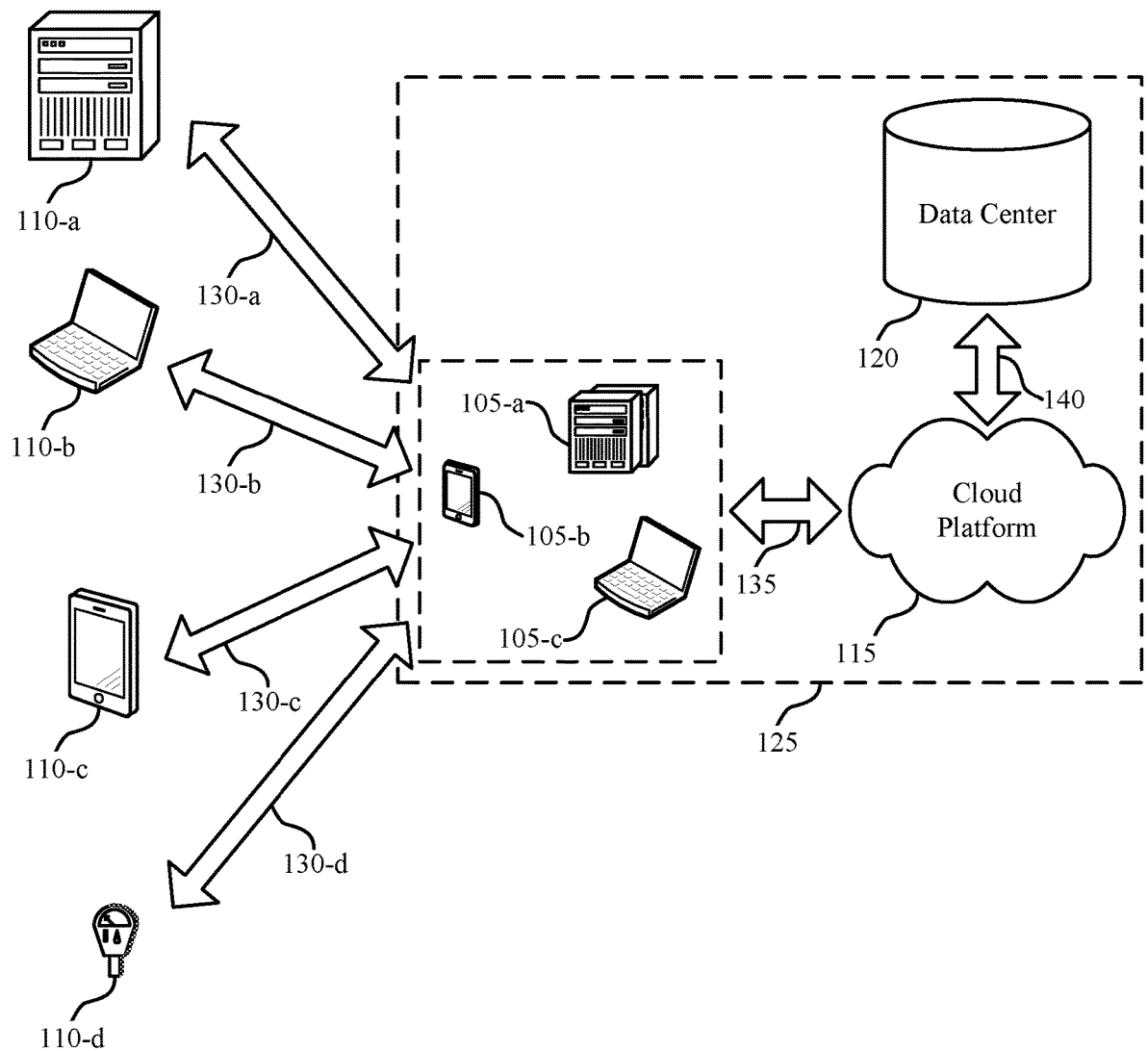
FIG. 1 illustrates an example of a system for cloud computing that supports lazy optimistic concurrency control (LOCC) in accordance with aspects of the present disclosure.

Some cloud platforms may use a database system containing multiple data stores to store data records (e.g., data records containing customer relationship management (CRM) information, among other types of data). In some database systems, an archiving process may move data records from one data store to another data store. Archiving data in a live database system may involve moving data records across databases of different ideologies, maintaining communications between separate databases, and ensuring data record consistency throughout the archiving process. In some systems, archiving data may involve locking large portions of a database to prevent data inconsistencies, which may tie up resources for a significant amount of time and can lead to poor system performance. In some cases, moving data records across databases of different ideologies may increase the number of errors encountered during the archiving process. Additionally or alternatively, in systems that do not lock data records, user modifications to data records after the start of the archiving process and before completion of the archiving process may result in inconsistent data records across databases.

A data storage system may implement lazy optimistic concurrency control (LOCC) to manage the archiving of data from a first database (e.g., a primary database configured or optimized for low-latency querying) to a second database (e.g., a secondary database configured or optimized for long-term data storage). LOCC may improve the efficiency and decrease the amount of resources used for a data archiving process. In some cases, a server may receive a set of data from a database (e.g., a relational database, a non-relational database, etc.) for an archiving process. Prior to writing the data to a second database, the data storage system may begin monitoring the set of data in the first database, such that the data storage system may identify any changes made to the data after the server receives the data. In some cases, monitoring the data in the first database and writing the data to the second database may occur concurrently. Monitoring and writing the data concurrently may allow the server to identify changes to any data records being archived without re-querying the data after writing to the second database, as the monitoring identifies these changes in real-time. This concurrent monitoring may reduce the latency involved in identifying changes to the data (e.g., as compared to re-querying the data after the set of data is written to the second database). Upon completion of writing the set of data to the second database, the server may identify (based on the monitoring process) one or more data records modified in the first database between the start and completion of the archiving process. The server may save the identified one or more data records, and in some cases information associated with the one or more data records, to a log file for further handling.

In some cases, the server may use a database connection with the first database to receive the set of data or an indication of the set of data for the archiving process. For example, the database connection may be used to issue a database command (e.g., a query) and receive a response (e.g., a result set copied from the first database). In some examples, the server may execute a first worker thread to receive the set of data for the archiving process from the first database. The set of data may be a subset of records in the first database and may be received via the database connection to the first database. In some cases, the server may remove this database connection after the set of data is received. For example, because the server does not lock the data records in the first database during the archiving process, the server may release this database connection, freeing up resources of the first database. Instead, the server may subscribe to a shared connection (i.e., a connection that can be concurrently used by multiple servers, processes, users, etc.) with the first database. The server may execute a second worker thread concurrent to the first worker thread to monitor the first database via the shared connection. In some cases, the second worker thread may record or otherwise provide an indication of which data records in the first database are modified while the server monitors the database via the shared connection. The first thread may write the set of data to a second database concurrent to this monitoring and, once the set of data is written to the second database, may identify any data records of the set of data that were modified after being copied from the first database but before being cleaned (i.e., removed) from the first database. The first thread may write the one or more identified records to one or more log files for handling by an administrator.

In some cases, the second worker thread may monitor for data changes by means of a service. For example, the second thread may listen or subscribe to a change data capture (CDC) service to monitor and record changes to the data. The CDC service may occupy the one shared database connection. Multiple applications may subscribe to this service (e.g., the CDC service), thereby allowing multiple applications to monitor data changes while utilizing a single, shared database connection. The second thread may notify the first thread of changes to the data, and the first thread may identify one or more altered data records relevant to the archiving process. The first thread may write the identified one or more data records to a file. If the one or more identified records include one or more child records (e.g., records that are dependent from other records), the first thread may handle the parent records (e.g., records that comprise one or more records) for these child records as if the parent records are also modified. The first thread may delete records from the first database that are successfully written to the second database and are not modified during the archiving process. The first thread may refrain from deleting records from the first database that are identified as modified during the archiving process, and the first thread may write these records to a log file. The records written to the log file may be rewritten to the second database at a later time. For example, the records written to the log file may be written to the second database in response to a user (e.g., an administrator) input or based on a scheduled process (e.g., a scheduled re-try process, a cron job, etc.).

Aspects of the disclosure are initially described in the context of an environment supporting an on-demand database service. Aspects of the disclosure are further described with respect to an archiving system, archiving processes, and a process flow diagram. Aspects of the disclosure are further illustrated by and described with reference to apparatus diagrams, system diagrams, and flowcharts that relate to LOCC.

FIG. 1 illustrates an example of a system 100 for cloud computing that supports LOCC in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the data center 120 may be an example of a database system including multiple interconnected databases, data stores, or any other types of data storage systems. For example, the data center 120 may include a primary database and a secondary database. In some cases, the primary database and the secondary database may support a data archiving process. The cloud platform 115 or an application server of subsystem 125 may handle data archiving between the databases. In some cases, the cloud platform 115 or an application server of subsystem 125 may copy data from the primary database and write the data to the secondary database (e.g., performing a data-value copy from the primary database to an archive record in the secondary database). Additionally or alternatively, the cloud platform 115 or an application server of subsystem 125 may delete data from the primary database (e.g., after the data is successfully archived at the secondary database). In some cases, a cloud client 105 or contact 110 may update a data record in the primary database during the archiving process, which may be captured and handled by the LOCC system. LOCC may support maintaining communication between separate, ideologically different databases throughout an archiving process in a multi-tenant database environment.

In some other systems, a data archiving system may rely on database transactions to preserve data integrity. Transactions use various mechanisms, such as database locks, to provide operations that are atomic, consistent, isolated, and durable. For example, the system may use a transaction for ensuring data integrity when copying data from a first database and writing the data to a second database. In some examples, the database transaction may prevent access to the data that was copied from the first database until writing to the second database is complete. This may degrade a user's experience by adding a wait time before data is accessible in the database system. In some examples, the database transaction may allow access to the data that was copied from the first database before writing to the second database is complete, but the transaction may pause to lookup the last modified timestamp of each row of the copied data before committing the transaction. If the data has not been altered during the transaction, the system may commit the data to the secondary database. However, if any of the data has been altered, the transaction is rolled back and the entire process may be attempted again. Therefore, the system may use large amounts of time and computing resources when archiving high volume and high activity data.

In contrast, the system 100 may implement LOCC to improve the efficiency of archiving data, mitigating locking data records, pausing to lookup data timestamps, and rolling back archiving transactions. For example, an application server of subsystem 125 may use a first worker thread to copy data from a database and write the data to a second database, and a second worker thread may asynchronously monitor the first database for changes. For example, the first worker thread may load, copy, check, and/or delete data records asynchronously while the second worker thread subscribes and actively listens for any changes to the data records. LOCC may support user access to the data during the archiving process and may prevent the roll back of archiving transactions, as changes that occur to data in the first database during the archiving process can be logged for later handling (e.g., mitigating any latency involved in reattempting to archive data records that are modified). Based on implementing LOCC, a server may run a highly performant archiving process, as the server may not pause the first worker thread to query for last modified timestamp information for the data records. Instead, the concurrent monitoring may allow for low-latency (e.g., real-time or pseudo-real-time) identification of modified data records.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Users of computing and cloud platforms may store large amounts of data in a database system. For example, a multi-tenant database system may store data records for multiple tenants. Some of the data may be rarely accessed, but storage may be governed by policy, law, etc. An archiving process may move data (e.g., based on which data records have been least recently accessed, least recently updated, least frequently accessed, etc.) from a primary data store to a secondary data store. This can decrease the size of the primary data store (e.g., freeing up resources for new data storage) and increase the efficiency of operations performed in the primary database.

Figure 2:
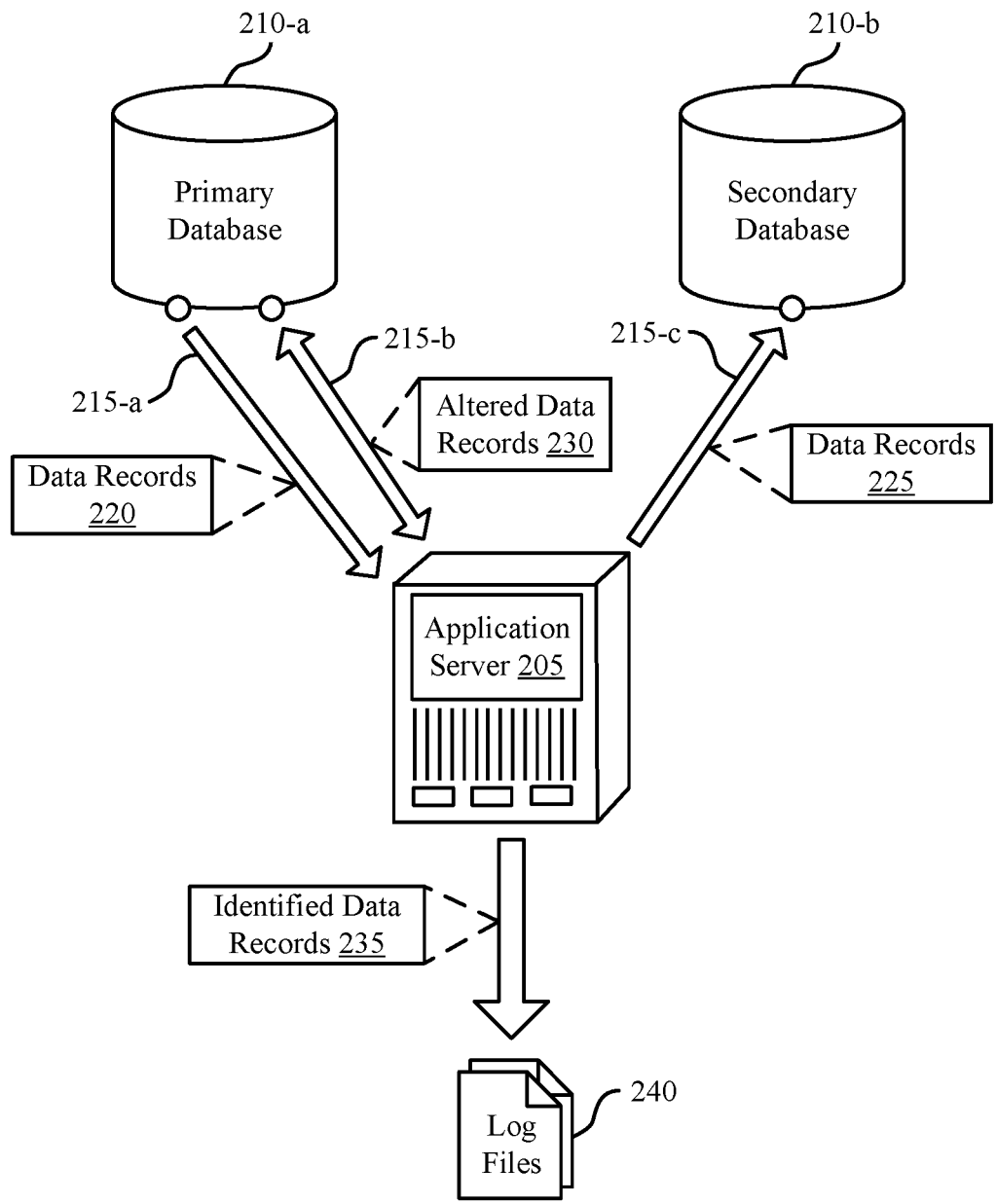
FIG. 2 illustrates an example of an archiving system that supports LOCC in accordance with aspects of the present disclosure.

FIG. 2 illustrates an example of an archiving system 200 that supports LOCC in accordance with aspects of the present disclosure. The archiving system 200 includes a number of database connections 215, a number of databases 210, an application server 205, and one or more log files 240. The system 200 may implement aspects of a system 100 as described with reference to FIG. 1. For example, a database 210 may be an example or component of a data center 120. The database connections 215, application server 205, and log files 240 may implement aspects of subsystem 125 as described with reference to FIG. 1.

The application server 205 may represent aspects of an application server, communication server, data processing server, database server, cloud-based server, server cluster, virtual machine, container, or some similar data processing device or system. The application server 205 may communicate with other devices such as the databases 210 and the log files 240. The databases 210 may implement various database ideologies (e.g., relational, non-relational, etc.). In some cases, primary database 210-a may be a relational database (e.g., a relational database management system (RDBMS)). In some cases, secondary database 210-b may be a non-relational database (e.g., a Hadoop distributed file system (HDFS), an HBase database, etc.). The application server 205 may use the database connections 215 to receive data from and/or transfer data to the databases 210. The database connections 215 may be shared connections (e.g., connections allowing multiple users or processes to connect to a database), unshared connections (e.g., connections allowing a single user or process to connect to a database), or a combination thereof.

In some cases, the application server 205 may execute a first thread (e.g., a first worker thread), which may involve establishing database connection 215-a. In some cases, the application server 205 may execute a second thread (e.g., a second worker thread), which may involve establishing database connection 215-b. In some cases, the application server 205 may receive the data records 220 or an indication of the data records 220 via database connection 215-a. The application server 205 may terminate database connection 215-a, and may additionally or alternatively initiate database connection 215-b. The termination of database connection 215-a may release resources that were used by database connection 215-a. In this way, the application server 205 may keep database connection 215-a (e.g., the transaction-specific connection) intact while copying the data records 220 from primary database 210-a and may release this database connection 215-a for the rest of the data archiving process, allowing other processes or devices to connect to primary database 210-a (e.g., based on a limited availability of database connections 215 at the database). In some cases, the application server 205 may not initiate connection 215-b but may subscribe or join database connection 215-b (e.g., a shared database connection supporting multiple different devices, processes, etc.). Furthermore, the application server 205 may initiate database connection 215-c for interacting with data storage at secondary database 210-b. In some cases, the first worker thread may establish database connection 215-c. The database connections 215 may support the application server 205 issuing database commands and receiving database result sets.

In some cases, the application server 205 may write the data records 225 to secondary database 210-b via database connection 215-c. In some examples, the data records 225 may include the same records as the data records 220. In some examples, the application server 205 may archive records that are re-formatted. For example, primary database 210-a and/or secondary database 210-b may provide an abstraction layer (e.g., an Object Relational Mapper (ORM), Application Programming Interface (API), Database Management System (DBMS), etc.) for interacting with the database. Additionally or alternatively, the application server 205 may reformat data records to be compatible with a particular ideology of a database 210 (e.g., supported formats, design principles, etc.). As such, the application server 205 may archive the data records 220 from primary database 210-a to secondary database 210-b as data records 225 in a data archiving process. The system 200 may or may not support restoring the data records from secondary database 210-b back to primary database 210-a.

During the writing process to secondary database 210-b, the application server 205 may monitor for changes in primary database 210-a using database connection 215-b. The application server 205 may receive the altered data records 230 or an indication (e.g., a set of record identifiers) of the altered data records 230 via database connection 215-b. The application server 205 may, for example, receive the altered data records 230 after writing the data records 225 to secondary database 210-b. In some cases, the altered data records 230 may be records that were altered during the archiving processes. For example, the altered data records 230 may include data records from primary database 210-a that are altered after the application server 205 receives the data records 220 and before the application server 205 completes writing the data records 225 to secondary database 210-b. In some cases, the altered data records 230 may be a subset of the data records 220. In some other cases, the altered data records 230 may not include any data records from the data records 220 (e.g., if one or more entire data sets are monitored for changes at primary database 210-a, not just the copied data records 220). In some cases, the altered data records 230 may include data records from the data records 220 and data records not from the data records 220. The application server 205 may identify the data records 235 that are present in both the data records 220 and the altered data records 230. For example, the application server 205 may filter the altered data records 230 to identify the data records 235 that are part of the data archiving process (e.g., included in the set of data records 220 copied for archiving and altered during the archiving process).

The application server 205 may record or save (e.g., write to a log file 240) records from the data records 225 that were altered during the archiving process (e.g., the identified data records 235). In some examples, primary database 210-a may store the identified data records 235 in their post-alteration form, and secondary database 210-b may store the identified data records 235 in their pre-alteration form. Recording or otherwise saving the identified data records 235 may preserve data integrity by creating a record of the data that is altered during the archiving processes. In some cases, the application server 205 may include the identified data records 235 in a future data archiving process. For example, based on the data records being modified in primary database 210-a during the archiving process, the system 200 may store two different versions of the identified data records 235 following completion of the archiving process, an up-to-date version in primary database 210-a and an out-of-date archived version in secondary database 210-b. By re-archiving the identified data records 235 in a subsequent process, the application server 205 may push the up-to-date versions of the identified data records 235 to secondary database 210-b to replace the out-of-date versions. If these data records are not further modified during this re-archiving process, the application server 205 may determine that these data records are now successfully archived (the databases 210 are synchronized) and may delete the data records from primary database 210-a.

In some cases, the identified data records 235 may, for example, include one or more child data records (e.g., records that are dependent from other records). If the application server 205 identifies an altered child record, the application server 205 may include a parent data record (e.g., a record that comprises one or more records) for the child record in the identified data records 235 (e.g., even if the parent data record itself is not altered). In some cases, the application server 205 may archive (e.g., write to secondary database 210-b) one or more of the identified data records 235 in a subsequent archiving process based on the information stored in a log file 240 (or stored in some other file or system indicating the data records that are out-of-sync between the databases 210). For example, a user (e.g., an administrator) may identify one or more records of the identified data records 235 to write to secondary database 210-b. Additionally or alternatively, an automated process (e.g., a scheduled process, a periodic or aperiodic re-try process, etc.) may identify one or more records of the identified data records 235 to write to secondary database 210-b.

In some cases, the application server 205 may identify data records to be deleted from primary database 210-a. In some examples, the records identified for deletion may include all records that were successfully written to secondary database 210-b and not altered in the primary database 210-a during the archiving process. For example, the application server 205 may identify all records of the data records 220 except the data records also present in the altered data records 230 (or in the identified data records 235, including parent records of altered child records) to be deleted from the primary database 210-a. The primary database 210-a may delete some or all of the data records identified for deletion. In some cases, all the data records 220 may be deleted from primary database 210-a. Deleting the data records that were identified for deletion may preserve data integrity, system reliability, and free up space at primary database 210-a. In some examples, the data records that are not modified during the archiving process are identified for deletion, so deleting these records removes unmodified records from primary database 210-a, thereby maintaining access to the most up-to-date versions of these data records in secondary database 210-b. In some examples, the data records that are modified during the archiving process are not identified for deletion, thereby maintaining access to the most up-to-date versions of these data records in primary database 210-a (e.g., until a re-archiving process can store these up-to-date versions of the data records in secondary database 210-b).

Figure 3:
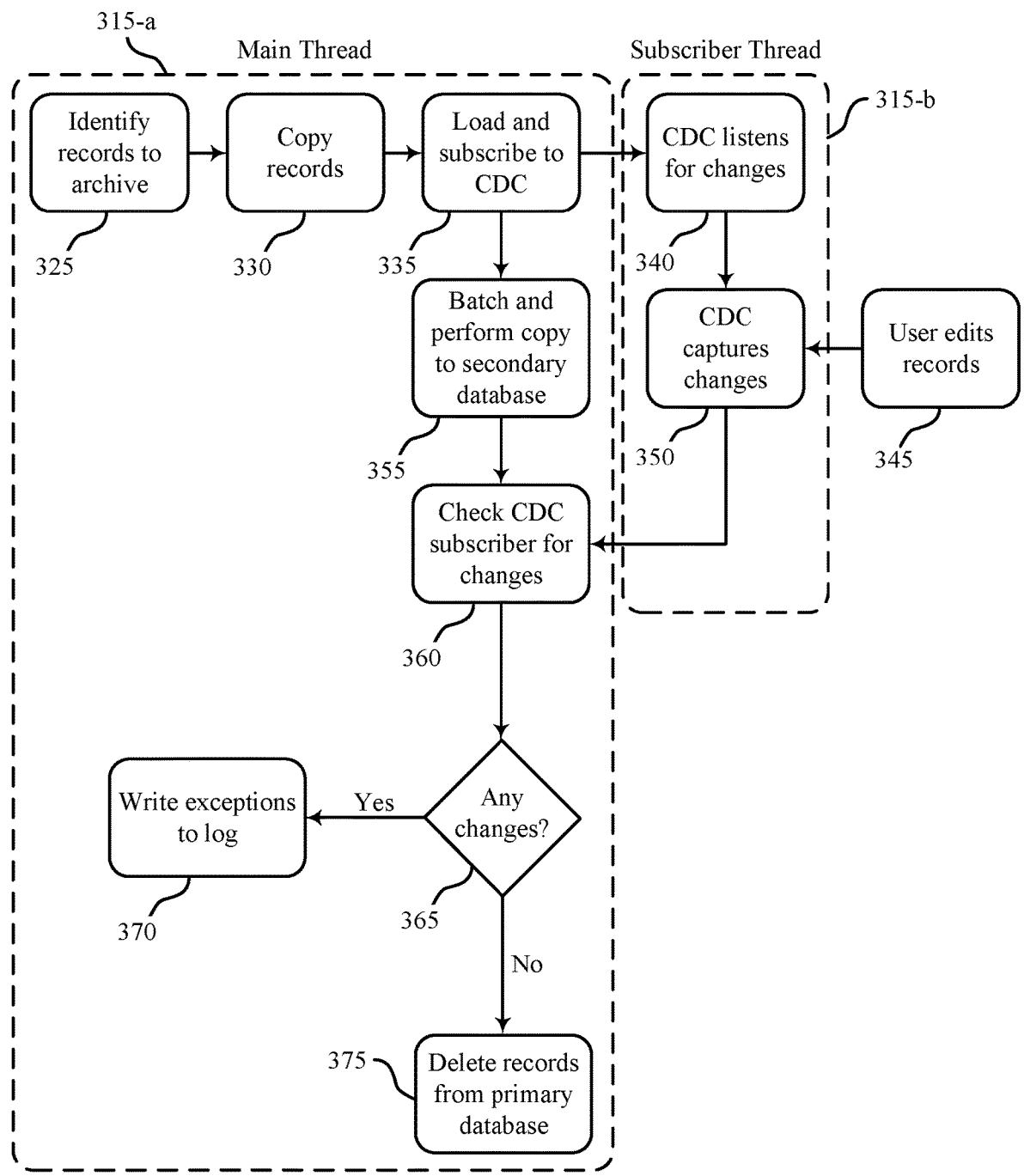
FIG. 3 illustrates an example of a data archiving system that supports LOCC in accordance with aspects of the present disclosure.

FIG. 3 illustrates an example of a data archiving system 300 that supports LOCC in accordance with aspects of the present disclosure. The data archiving system 300 includes a main thread 315-a and a subscriber thread 315-b, which may be examples or components of one or more servers and/or cloud platforms as described with reference to FIGS. 1 and 2. For example, an application server may execute the main thread 315-a and the subscriber thread 315-b to implement LOCC for a data archiving process between a first database (e.g., a primary database) and a second database (e.g., a secondary database).

At 325, a server (e.g., an application server 205 as described with reference to FIG. 2) may identify records for an archiving process. In some cases, this may be done manually (e.g., by a user) or automatically (e.g., by a scheduled process). At 330, the application server may copy the identified records from the first database. In some cases, the application server may issue database commands to copy the identified records. At 335, the application server may load and subscribe to a service (e.g., a CDC service, a change event capture service, etc.). In some cases, the CDC service may run on a different thread (e.g., the subscriber thread 315-b). For example, the application server may create a thread to run the CDC service or may run the CDC service on an existing thread. Additionally or alternatively, the application server may subscribe to an already running CDC service. At 340, the CDC service may listen (i.e., monitor) for changes to records in the first database. For example, the CDC service may plugin on top of the first database and maintain a list of record identifiers for any records modified for a particular time span (e.g., from a start timestamp to an end timestamp). The CDC service may use a single database connection to the first database across all processes, tenants, data types, data tables, etc. (e.g., as opposed to a transaction-specific database connection used to copy the records for archiving, which may be specific to a single tenant, high-level data entity, etc. in the first database). As such, the shared database connection of the CDC service may efficiently utilize the database resources. Additionally or alternatively, the CDC service may monitor all data records, data record types, data storage tables, or a combination thereof in the first database (e.g., rather than monitoring a specific limited set of data).

At 345, a user may edit or alter one or more data records stored in the first database. Editing may include, for example, adding, removing, updating, etc. a data record in the first database. At 350, the CDC service may capture these changes. In some cases, the CDC service may capture changes to the records identified at step 325. In some other cases, the CDC service may capture changes to any data records in the first database (or any data records in a subset of tables or groups in the first database).

The subscriber thread 315-b (e.g., an asynchronous thread) may be running concurrently to the main thread 315-a. In some cases, the subscriber thread 315-b may notify the main thread 315-a of the changes captured at 350 (e.g., via an interrupt, via an event, etc.). Additionally or alternatively, the main thread 315-a may check the subscriber thread 315-b for captured changes. At 355, the application server may batch and copy (e.g., write) the records identified at 325 to a second database. During this process, the subscriber thread 315-b may subscribe to the CDC service to capture any changes to the first database. At 360, the application server may check the CDC service for the captured changes. At 365, the application server may check to see if any changes to the identified data records (e.g., the data records copied to the second database) were captured by the CDC. In some cases, there may be one or more captured changes that relate to the records identified at 325. In such cases, at 370, the application server may record the one or more captured changes as one or more exceptions. For example, the application server may write the one or more exceptions to a log file to track any data records modified in the first database while the main thread 315-a is writing these data records (e.g., now outdated versions of these data records) to the second database. In some cases, there may not be any changes captured that relate to the records identified at 325.

At 375, the application server may delete records from the first database. For example, the application server may permanently delete some or all of the records identified at 325 from the first database. In some cases, the application server may delete the records identified at 325 that did not have changes captured at 350. That is, the application server may delete records that were written to the second database and not altered during the archiving process. The application server may refrain from deleting records written to the second database but modified in the first database (e.g., after copying the records at 330). In this way, the application server may maintain the latest version of these data records in the first database and may identify these data records using the log exceptions.

Figure 4:
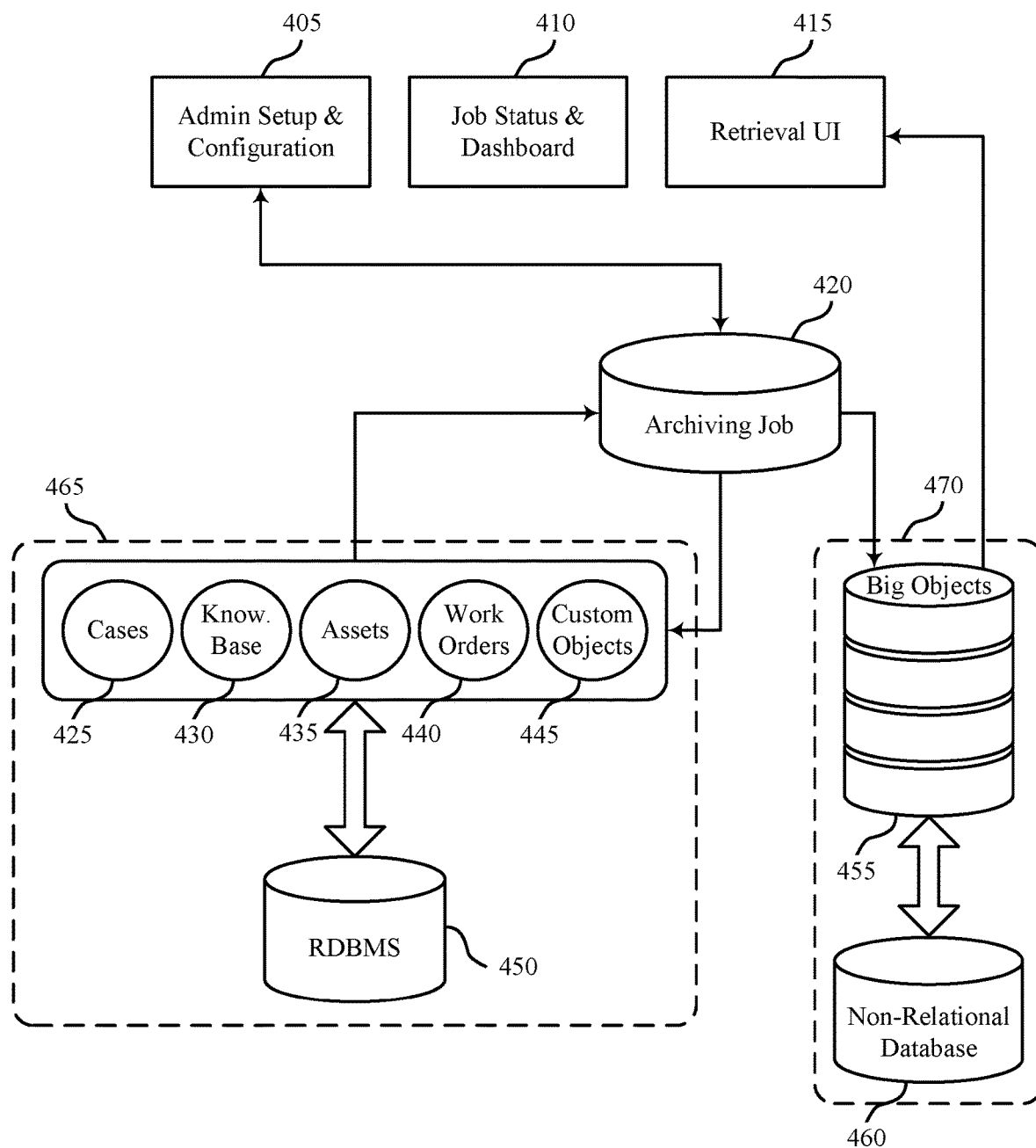
FIG. 4 illustrates an example of an archiving project that supports LOCC in accordance with aspects of the present disclosure.

FIG. 4 illustrates an example of an archiving project 400 that supports LOCC in accordance with aspects of the present disclosure. The RDBMS 450 may be an example of a primary database 210-a as described with reference to FIG. 2 and the non-relational database 460 may be an example of secondary database 210-b as described with reference to FIG. 2. The primary storage system 465 may store data records related to one or more object or information types, such as data related to cases 425, a knowledge base 430, assets 435, work orders 440, custom objects 445, or a combination thereof. The RDBMS 450 may support low-latency querying of such data records in the primary storage system 465. The secondary storage system 470 may include a big objects store 455, a non-relational database 460, or both. In some cases, a user (e.g., an administrative user) may setup and configure an archiving process using an administrator setup and configuration 405. For example, the user may set the frequency of archiving, at what time of day archiving should occur, etc. The dashboard 410 may allow users to view information such as a status of an archiving job (or other processing jobs). The retrieval user interface (UI) 415 may display (e.g., on a user device) data retrieved from the database system, including data retrieved from the RDBMS 450, the big objects store 455, the non-relational database 460 (e.g., an HBase database), or any combination thereof. The job scheduler 420 (e.g., a cron job scheduler) may schedule jobs and processes for archiving data records. In some examples, an archiving processes may be initiated by the job status and dashboard 410 (e.g., based on a user input to a user device) or the job scheduler 420.

In some cases, the RDBMS 450 may support the use of structured data. In some examples, an RDBMS 450 may support filtering and sorting of data and may provide rapid access to data. In some examples, the RDBMS 450 may be used as a primary store of data for an application, organization, or service (e.g., a CRM application may run on the RDBMS 450). In some cases, the non-relational database 460 may support the use of semi-structured or non-structured data. In some examples, the non-relational database 460 may support the storage of large amounts of data and may be used as a secondary data store. For example, the non-relational database 460 may store data that is not accessed often, but is maintained in accordance with a policy, a law, a user configuration, or any combination thereof. To increase data storage space at the RDBMS 450, the job scheduler 420 may perform data archiving jobs to move data from storage at the RDBMS 450 to long-term storage at the non-relational database 460. The job scheduler 420 may implement LOCC as described herein to maintain data consistency without locking access to data records during the archiving process. In some cases, the job scheduler 420 may opportunistically archive records (e.g., based on available processing resources, an expected processing load on the database system, etc.). As such, the data archiving process may be transparent to users accessing data in the database system.

Figure 5:
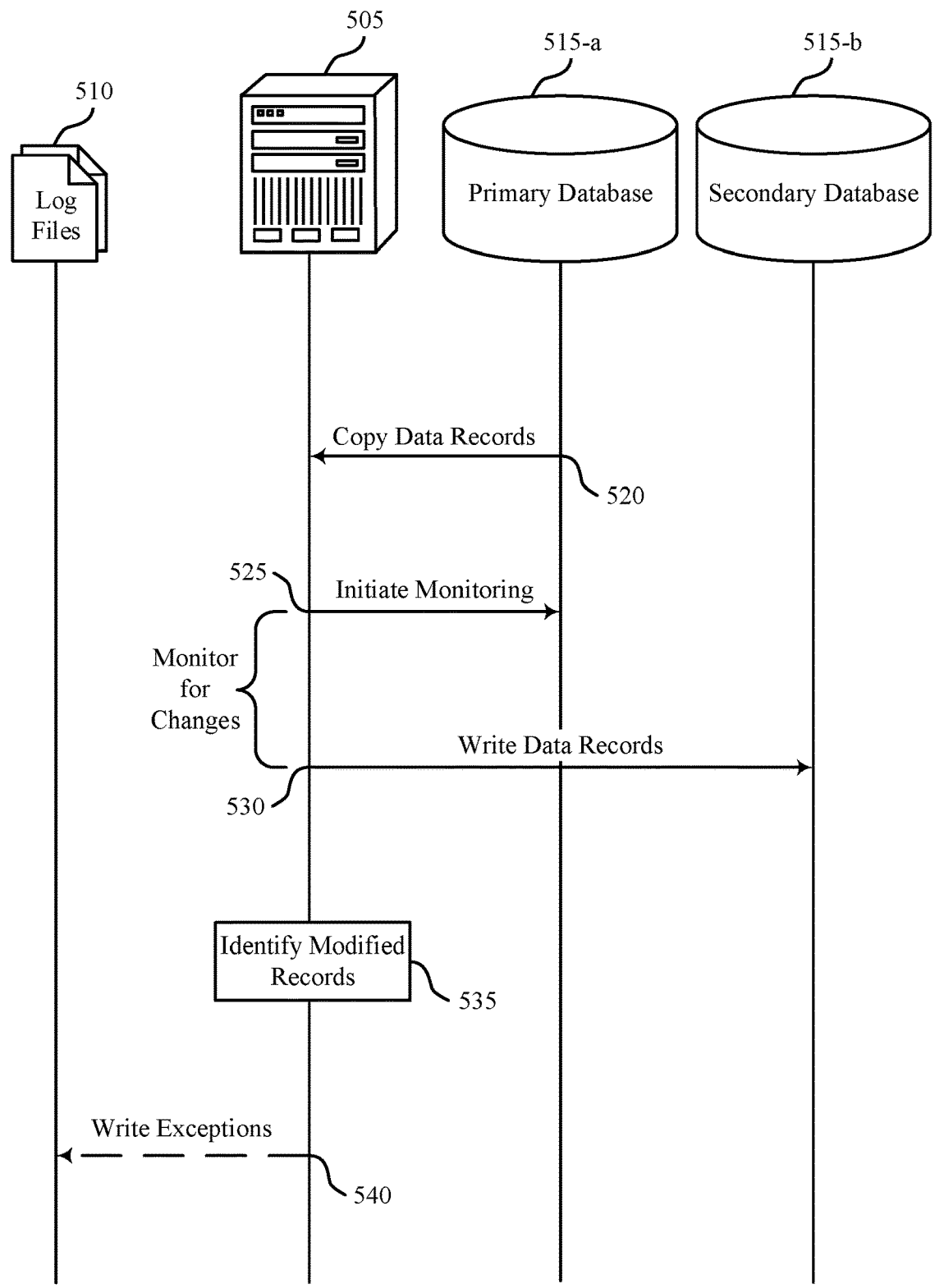
FIG. 5 illustrates an example of a process flow that supports LOCC in accordance with aspects of the present disclosure.

FIG. 5 illustrates an example of a process flow 500 that supports LOCC in accordance with aspects of the present disclosure. The process flow 500 includes an application server 505, log files 510, primary database 515-a, and secondary database 515-b. These may be examples of the corresponding devices described with reference to FIGS. 1 through 4. The application server 505 may implement LOCC to perform an archiving process from primary database 515-a to secondary database 515-b. LOCC may support maintaining data integrity and preventing data losses in a reliable and performant manner (e.g., by handling data records modified after a copy process but before a deletion process in primary database 515-a for the data archiving). Alternative examples of the following may be implemented, where some steps are performed in a different order than described or are not performed at all. In some cases, steps may include additional features not mentioned below, or further steps may be added.

At 520, the application server 505 may receive a set of data records for an archiving process. The application server 505 may receive the data records or an indication of data records that are to be archived. In some cases, the application server 505 may receive a description or identifiers for records that are to be archived. Additionally or alternatively, the application server 505 may copy a set of records from primary database 515-a. For example, the application server 505 may query primary database 515-a to receive the data records for archiving and may base the query on the description and/or identifiers of the records. In some cases, the application server 505 may use a database connection to receive the data records from database 515-a. In some cases, the application server 505 may terminate or suspend the database connection to database 515-a after receiving the data records (e.g., to reduce the resource overhead for primary database 515-a involved in the archiving process).

At 525, the application server 505 may initiate a monitoring process. In some cases, the monitoring may include subscribing to a CDC service. For example, the application server 505 may launch a new thread to monitor data changes within primary database 515-a. Additionally or alternatively, the monitoring of primary database 515-a may utilize a shared (e.g., pooled) database connection. In some cases, the monitoring may continue at least until the application server 505 completes a write operation to secondary database 515-b. At 530, the application server 505 may write the data records received at step 520 to secondary database 515-b. In some cases, the application server 505 may write some or all of these data records concurrent to the monitoring process. At 535, the application server 505 may identify records modified after the initiation of the monitoring and before completion of the writing operation. For example, based on the CDC service monitoring primary database 515-a, the application server 505 may identify the modified (e.g., altered) data records. In some cases, the application server 505 may notify the monitoring service that the monitoring is no longer needed (e.g., upon completion of the writing process to secondary database 515-b). For example, the application server 505 may unsubscribe from the CDC service.

In some cases, the application server 505 may receive data records or data record identifiers from the CDC service. These records or record identifiers may indicate the records that have been modified after the initiation of the monitoring of primary database 515-a and before completion of the writing to secondary database 515-b. In some cases, the application server 505 may filter the data records based on the data records written to secondary database 515-b at step 530. In some cases, the application server 505 may identify a child record as having been modified and may handle the corresponding parent record as if the parent record had also been modified. At 540, the application server 505 may log the records identified at step 535 (e.g., to one or more log files 510, to a data store, to an exception handling system, etc.). In some examples, the application server 505 may log one or more parent records based on the identification of one or more modified child records. In some cases, the records identified at step 535 may include parent records, child records, a subset of the records received at step 520, or any combination thereof.

The logged records may allow a user or system to identify data records incorrectly archived from primary database 515-a to secondary database 515-b. For example, because the database system remains live throughout the archiving process, a user or function may modify a data record as it is being archived. In such cases, the archived version of the data record may not capture accurate information for the modified version of the data record. The log files 510 may record information related to these modified data records (e.g., the data record identifiers, the modifications to the data records, why the data records were not deleted, etc.). A user may view the log files 510 and determine how to handle these identified data records (e.g., archive them, delete them, etc.). In this way, the LOCC is "lazy" as it does not resolve the modification issues, but instead flags these issues for handling by a user or some other system. For example, the user may select to re-archive the modified versions of these data records from primary database 515-*a* to secondary database 515-*b* to resynchronize these data records in secondary database 515-*b*. In some examples, the re-archiving process may implement a similar LOCC technique. In some other examples, the application server 505 may lock these data records during the re-archiving process to ensure that the correct versions are archived. However, based on first performing the LOCC archiving process, the application server 505 may significantly reduce the number of locked records and the amount of time for which these records are locked.

Figure 6:
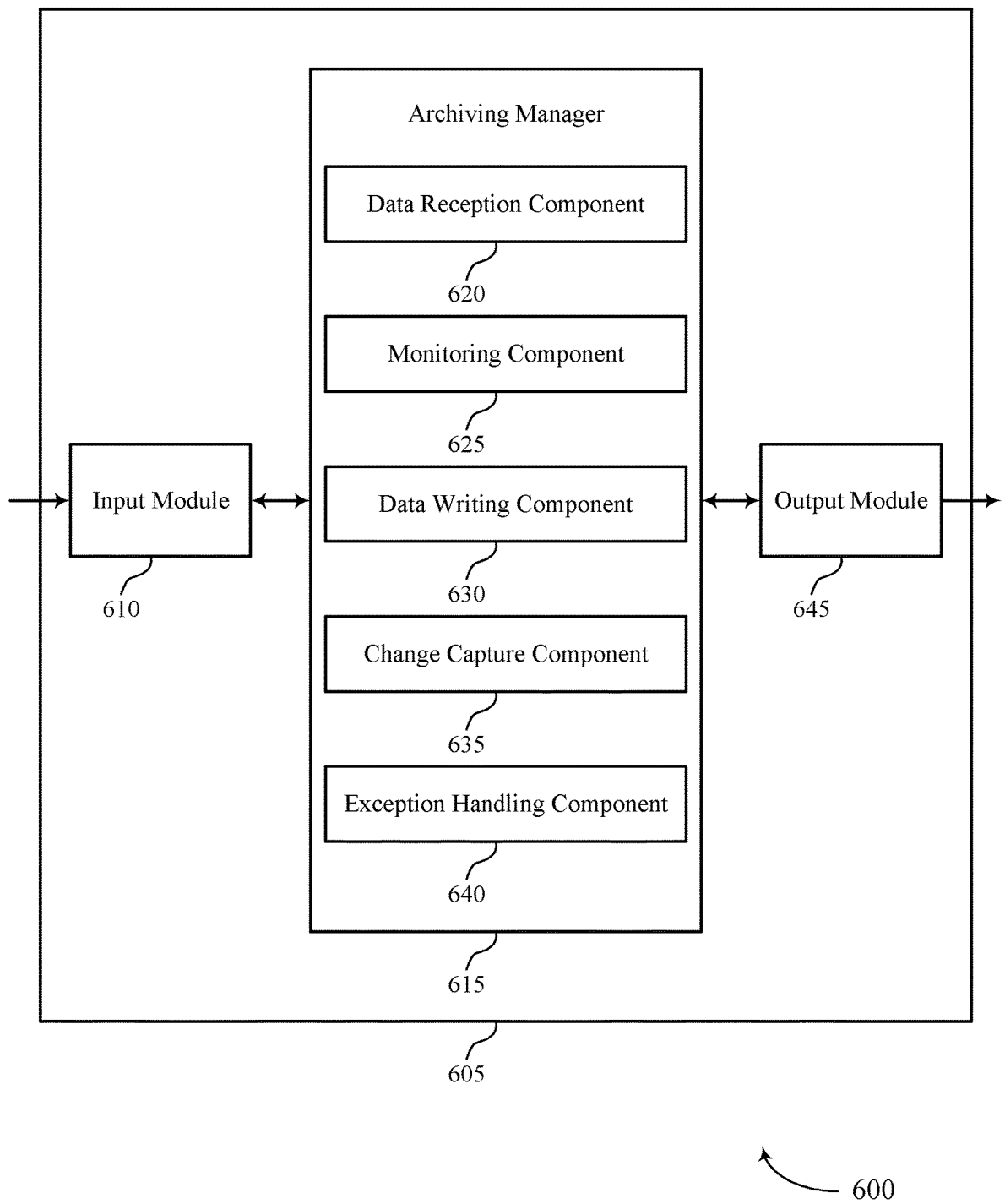
FIG. 6 shows a block diagram of an apparatus that supports LOCC in accordance with aspects of the present disclosure.

FIG. 6 shows a block diagram 600 of an apparatus 605 that supports LOCC control in accordance with aspects of the present disclosure. The apparatus 605 may include an input module 610, an archiving manager 615, and an output module 645. The apparatus 605 may also include a processor. Each of these components may be in communication with one another (e.g., via one or more buses). In some cases, the apparatus 605 may be an example of a user terminal, an application server, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the archiving manager 615 to support data archiving using lazy optimistic concurrency control. In some cases, the input module 610 may be a component of an input/output (I/O) controller 815 as described with reference to FIG. 8.

The archiving manager 615 may include a data reception component 620, a monitoring component 625, a data writing component 630, a change capture component 635, and an exception handling component 640. The archiving manager 615 may be an example of aspects of the archiving manager 705 or 810 described with reference to FIGS. 7 and 8.

The archiving manager 615 and/or at least some of its various sub-components may be implemented in hardware, software executed by a processor, firmware, or any combination thereof. If implemented in software executed by a processor, the functions of the archiving manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The archiving manager 615 and/or at least some of its various sub-components may be physically located at various positions, including being distributed such that portions of functions are implemented at different physical locations by one or more physical devices. In some examples, the archiving manager 615 and/or at least some of its various sub-components may be a separate and distinct component in accordance with various aspects of the present disclosure. In other examples, the archiving manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The archiving manager 615 may be implemented for data archiving from a first database (e.g., a primary data store) to a second database (e.g., a secondary data store). The data reception component 620 may receive, from the first database, a set of data for an archiving process. The monitoring component 625 may initiate monitoring for changes to the set of data in the first database based on receiving the set of data. The data writing component 630 may write, to the second database and concurrent to the monitoring, the set of data based on the archiving process. The change capture component 635 may identify, after completion of writing the set of data to the second database and based on the monitoring, at least one data record of the set of data that is modified in the first database since initiating the monitoring. The exception handling component 640 may write, to a log for exception handling, the at least one data record based on the identifying.

The output module 645 may manage output signals for the apparatus 605. For example, the output module 645 may receive signals from other components of the apparatus 605, such as the archiving manager 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
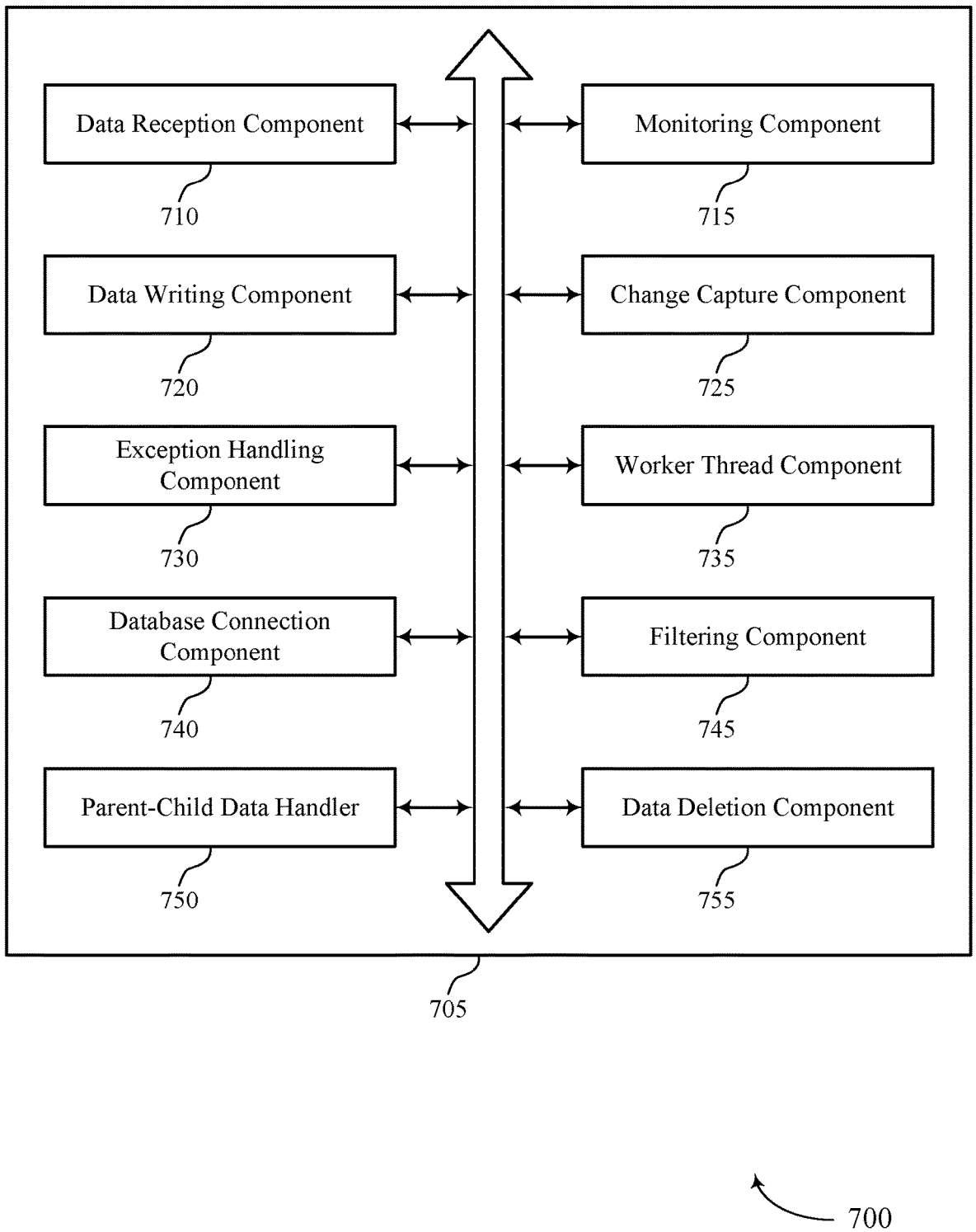
FIG. 7 shows a block diagram of an archiving manager that supports LOCC in accordance with aspects of the present disclosure.

FIG. 7 shows a block diagram 700 of an archiving manager 705 that supports LOCC control in accordance with aspects of the present disclosure. The archiving manager 705 may be an example of aspects of an archiving manager 615 or an archiving manager 810 described herein. The archiving manager 705 may include a data reception component 710, a monitoring component 715, a data writing component 720, a change capture component 725, an exception handling component 730, a worker thread component 735, a database connection component 740, a filtering component 745, a parent-child data handler 750, and a data deletion component 755. Each of these modules may communicate, directly or indirectly, with one another (e.g., via one or more buses). The archiving manager 705 may be implemented at a processing device or system (e.g., an application server, a database server, a server cluster, a virtual machine, a container, etc.) and may support data archiving from a first database to a second database.

The data reception component 710 may receive, from the first database, a set of data for an archiving process. In some cases, the first database stores a total set of data records, and the set of data for the archiving process is a subset of the total set of data records stored at the first database. In some cases, the set of data is received from the first database via a first abstraction layer. In some examples, the first database is an example of a relational database (e.g., an RDBMS).

The monitoring component 715 may initiate monitoring for changes to the set of data in the first database based on receiving the set of data. The data writing component 720 may write, to the second database and concurrent to the monitoring, the set of data based on the archiving process. In some cases, the set of data is written to the second database via a second abstraction layer. In some examples, the second database is an example of a non-relational database (e.g., HBase).

The change capture component 725 may identify, after completion of writing the set of data to the second database and based on the monitoring, at least one data record of the set of data that is modified in the first database since initiating the monitoring. The exception handling component 730 may write, to a log for exception handling, the at least one data record based on the identifying. In some examples, the exception handling component 730 may receive, from a user device, a user input to the log for exception handling selecting the at least one data record for a second archiving process and may rewrite, to the second database, the at least one data record based on the second archiving process. In some other examples, the exception handling component 730 may automatically select the at least one data record for a second archiving process based on a schedule and may rewrite, to the second database, the at least one data record based on the second archiving process.

The worker thread component 735 may execute a first worker thread, where executing the first worker thread includes receiving the set of data for the archiving process, writing the set of data to the second database, identifying the at least one data record that is modified in the first database, and writing the at least one data record to the log. The worker thread component 735 may additionally execute a second worker thread concurrent to executing the first worker thread, where the second worker thread is different from the first worker thread and executing the second worker thread includes initiating the monitoring. In some examples, the worker thread component 735 may register the second worker thread to a change event capture service of the first database, where the monitoring for changes to the set of data in the first database is based on registering the second worker thread to the change event capture service.

The database connection component 740 may establish, with the first database, a transaction-specific database connection for the archiving process, where the set of data is received from the first database via the transaction-specific database connection. The database connection component 740 may remove, from the first database, the transaction-specific database connection based on receiving the set of data for the archiving process and may subscribe to a shareable database connection for the first database, where the set of data in the first database is monitored for changes based on subscribing to the shareable database connection. In some cases, the archiving process corresponds to a first tenant owning the set of data, a first data entity corresponding to the set of data, or both, and one or more additional archiving processes subscribe to the shareable database connection for the first database, where the one or more additional archiving processes correspond to one or more additional tenants different from the first tenant, one or more additional data entities different from the first data entity, or both.

In some cases, identifying the at least one data record that is modified in the first database further involves the filtering component 745 receiving a set of data record identifiers corresponding to all data records of the set of data records that are modified in the first database between initiating the monitoring and the completion of writing the set of data to the second database, where receiving the set of data record identifiers is based on the monitoring, and filtering the set of data record identifiers to determine at least one data record identifier corresponding to the set of data for the archiving process, where the at least one data record identifier identifies the at least one data record that is modified in the first database.

In some cases, the at least one data record is a child data record for a parent data record. The parent-child data handler 750 may write, to the log for exception handling, the parent data record based on the child data record that is modified in the first database. The data deletion component 755 may refrain from deleting, from the first database, the child data record and the parent data record based on the identifying and may delete, from the first database, the set of data for the archiving process except for the child data record and the parent data record based on writing the set of data to the second database and the refraining.

In some examples, the data deletion component 755 may refrain from deleting, from the first database, the at least one data record based on the identifying and may delete, from the first database, the set of data for the archiving process except for the at least one data record based on writing the set of data to the second database and the refraining.

Figure 8:
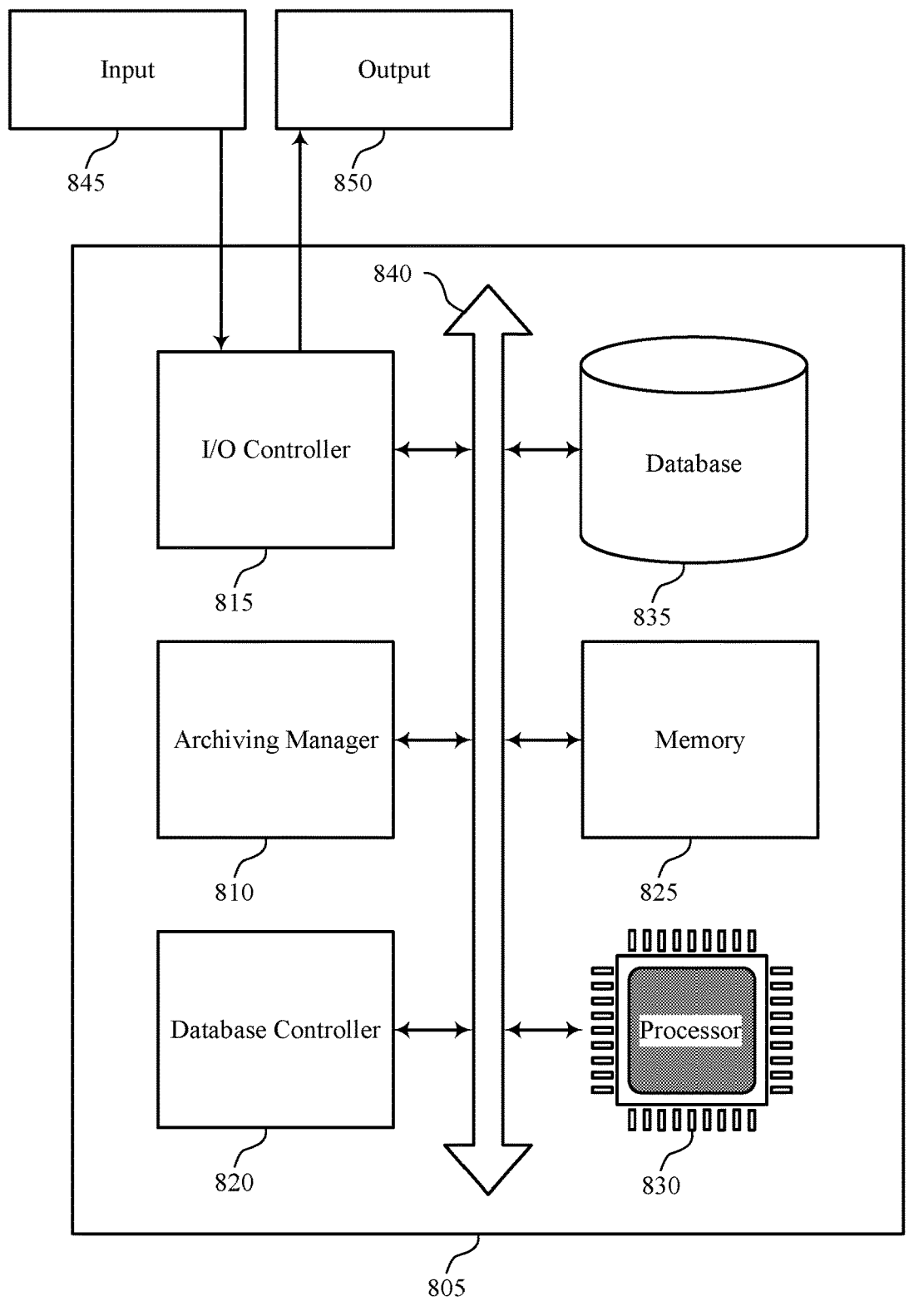
FIG. 8 shows a diagram of a system including a device that supports LOCC in accordance with aspects of the present disclosure.

FIG. 8 shows a diagram of a system 800 including a device 805 that supports LOCC in accordance with aspects of the present disclosure. The device 805 may be an example of or include the components of an application server or an apparatus 605 as described herein. The device 805 may include components for bi-directional data communications including components for transmitting and receiving communications, including an archiving manager 810, an I/O controller 815, a database controller 820, memory 825, a processor 830, and a database 835. These components may be in electronic communication via one or more buses (e.g., bus 840).

The archiving manager 810 may be an example of an archiving manager 615 or 705 as described herein. For example, the archiving manager 810 may perform any of the methods or processes described above with reference to FIGS. 6 and 7. In some cases, the archiving manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting lazy optimistic concurrency control).

Figure 9:
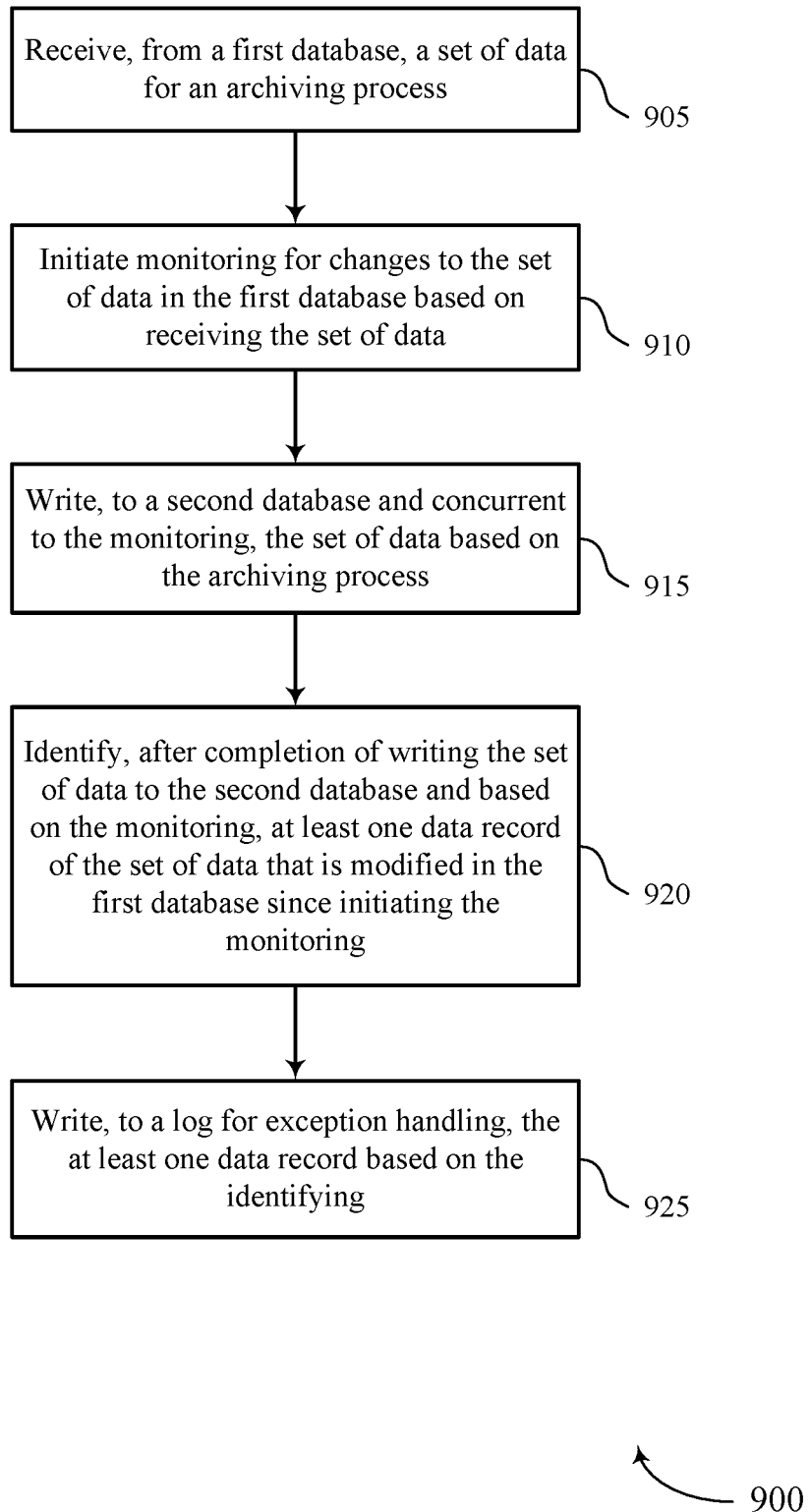
FIGS. 9 through 12 show flowcharts illustrating methods that support LOCC in accordance with aspects of the present disclosure.

FIG. 9 shows a flowchart illustrating a method 900 that supports LOCC in accordance with aspects of the present disclosure. The operations of method 900 may be implemented by an application server or its components as described herein. For example, the operations of method 900 may be performed by an archiving manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may receive, from a first database, a set of data for an archiving process. The operations of 905 may be performed according to the methods described herein. In some examples, aspects of the operations of 905 may be performed by a data reception component as described with reference to FIGS. 6 through 8.

At 910, the application server may initiate monitoring for changes to the set of data in the first database based on receiving the set of data. The operations of 910 may be performed according to the methods described herein. In some examples, aspects of the operations of 910 may be performed by a monitoring component as described with reference to FIGS. 6 through 8.

At 915, the application server may write, to a second database and concurrent to the monitoring, the set of data based on the archiving process. The operations of 915 may be performed according to the methods described herein. In some examples, aspects of the operations of 915 may be performed by a data writing component as described with reference to FIGS. 6 through 8.

At 920, the application server may identify, after completion of writing the set of data to the second database and based on the monitoring, at least one data record of the set of data that is modified in the first database since initiating the monitoring. The operations of 920 may be performed according to the methods described herein. In some examples, aspects of the operations of 920 may be performed by a change capture component as described with reference to FIGS. 6 through 8.

At 925, the application server may write, to a log for exception handling, the at least one data record based on the identifying. The operations of 925 may be performed according to the methods described herein. In some examples, aspects of the operations of 925 may be performed by an exception handling component as described with reference to FIGS. 6 through 8.

Figure 10:
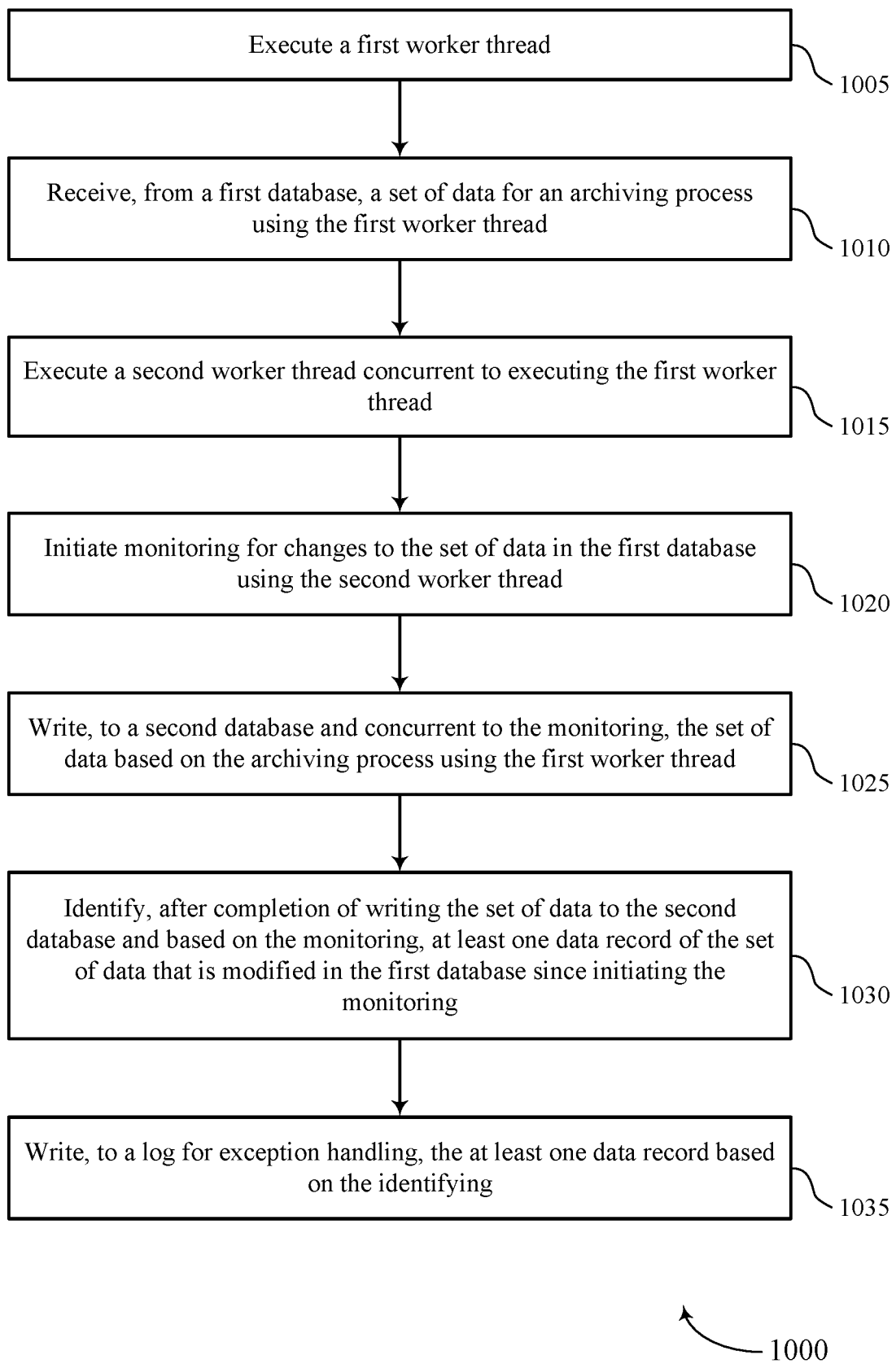

FIG. 10 shows a flowchart illustrating a method 1000 that supports LOCC in accordance with aspects of the present disclosure. The operations of method 1000 may be implemented by an application server or its components as described herein. For example, the operations of method 1000 may be performed by an archiving manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may execute a first worker thread, where executing the first worker thread includes the operations described herein with reference to 1010, 1025, 1030, and 1035. The operations of 1005 may be performed according to the methods described herein. In some examples, aspects of the operations of 1005 may be performed by a worker thread component as described with reference to FIGS. 6 through 8.

At 1010, the application server may receive, from a first database, a set of data for an archiving process (e.g., using the first worker thread). The operations of 1010 may be performed according to the methods described herein. In some examples, aspects of the operations of 1010 may be performed by a data reception component as described with reference to FIGS. 6 through 8.

At 1015, the application server may execute a second worker thread concurrent to executing the first worker thread, where the second worker thread is different from the first worker thread. Executing the second worker thread may include the operations described herein with reference to 1020. The operations of 1015 may be performed according to the methods described herein. In some examples, aspects of the operations of 1015 may be performed by a worker thread component as described with reference to FIGS. 6 through 8.

At 1020, the application server may initiate monitoring for changes to the set of data in the first database based on receiving the set of data (e.g., using the second worker thread). The operations of 1020 may be performed according to the methods described herein. In some examples, aspects of the operations of 1020 may be performed by a monitoring component as described with reference to FIGS. 6 through 8.

At 1025, the application server may write, to a second database and concurrent to the monitoring, the set of data based on the archiving process. The operations of 1025 may be performed according to the methods described herein. In some examples, aspects of the operations of 1025 may be performed by a data writing component as described with reference to FIGS. 6 through 8.

At 1030, the application server may identify, after completion of writing the set of data to the second database and based on the monitoring, at least one data record of the set of data that is modified in the first database since initiating the monitoring. The operations of 1030 may be performed according to the methods described herein. In some examples, aspects of the operations of 1030 may be performed by a change capture component as described with reference to FIGS. 6 through 8.

At 1035, the application server may write, to a log for exception handling, the at least one data record based on the identifying. The operations of 1035 may be performed according to the methods described herein. In some examples, aspects of the operations of 1035 may be performed by an exception handling component as described with reference to FIGS. 6 through 8.

Figure 11:
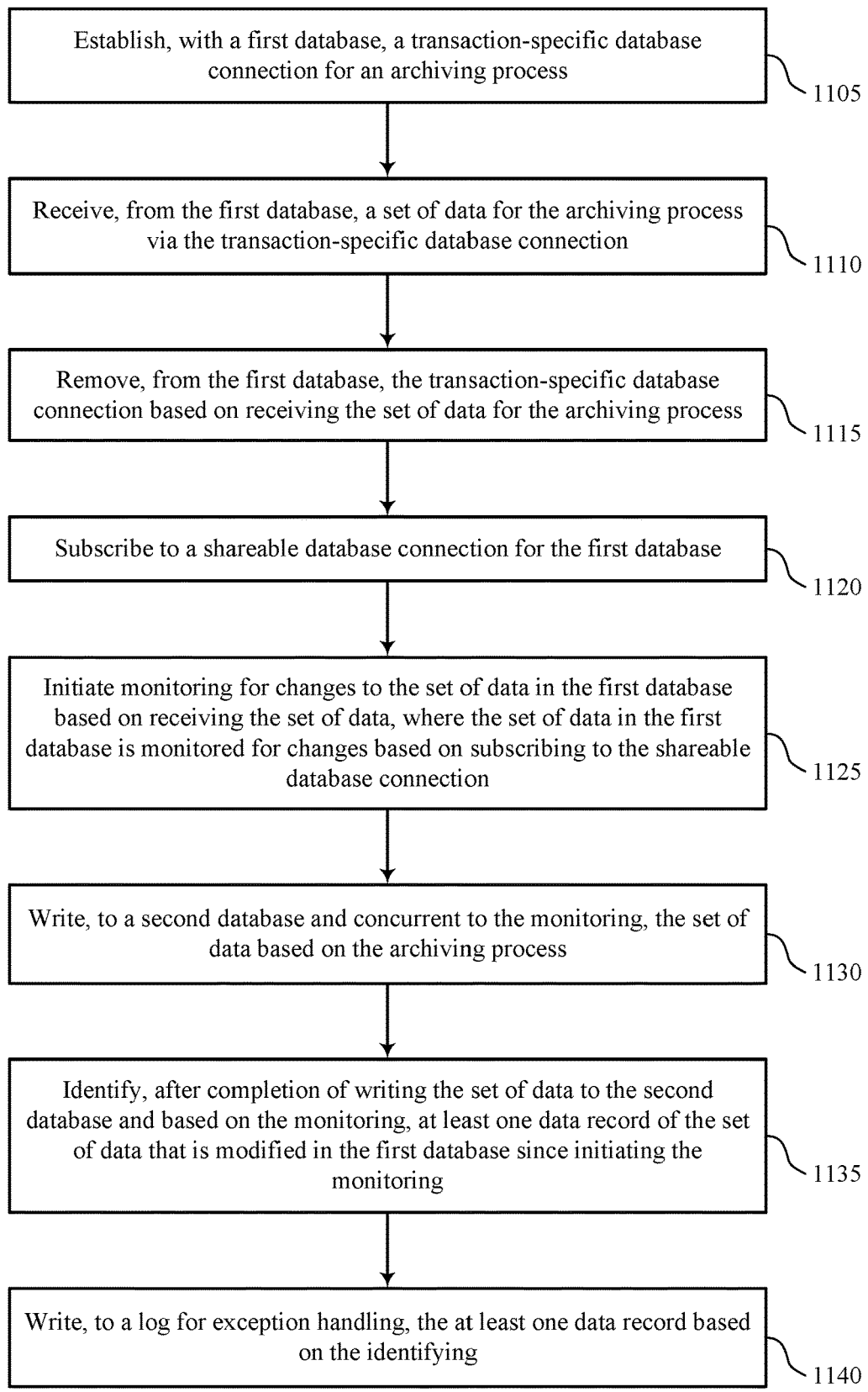

FIG. 11 shows a flowchart illustrating a method 1100 that supports LOCC in accordance with aspects of the present disclosure. The operations of method 1100 may be implemented by an application server or its components as described herein. For example, the operations of method 1100 may be performed by an archiving manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may establish, with a first database, a transaction-specific database connection for an archiving process. The operations of 1105 may be performed according to the methods described herein. In some examples, aspects of the operations of 1105 may be performed by a database connection component as described with reference to FIGS. 6 through 8.

At 1110, the application server may receive, from the first database, a set of data for the archiving process, where the set of data is received from the first database via the transaction-specific database connection. The operations of 1110 may be performed according to the methods described herein. In some examples, aspects of the operations of 1110 may be performed by a data reception component as described with reference to FIGS. 6 through 8.

At 1115, the application server may remove, from the first database, the transaction-specific database connection based on receiving the set of data for the archiving process. The operations of 1115 may be performed according to the methods described herein. In some examples, aspects of the operations of 1115 may be performed by a database connection component as described with reference to FIGS. 6 through 8.

At 1120, the application server may subscribe to a shareable database connection for the first database. The operations of 1120 may be performed according to the methods described herein. In some examples, aspects of the operations of 1120 may be performed by a database connection component as described with reference to FIGS. 6 through 8.

At 1125, the application server may initiate monitoring for changes to the set of data in the first database based on receiving the set of data, where the set of data in the first database is monitored for changes based on subscribing to the shareable database connection. The operations of 1125 may be performed according to the methods described herein. In some examples, aspects of the operations of 1125 may be performed by a monitoring component as described with reference to FIGS. 6 through 8.

At 1130, the application server may write, to a second database and concurrent to the monitoring, the set of data based on the archiving process. The operations of 1130 may be performed according to the methods described herein. In some examples, aspects of the operations of 1130 may be performed by a data writing component as described with reference to FIGS. 6 through 8.

At 1135, the application server may identify, after completion of writing the set of data to the second database and based on the monitoring, at least one data record of the set of data that is modified in the first database since initiating the monitoring. The operations of 1135 may be performed according to the methods described herein. In some examples, aspects of the operations of 1135 may be performed by a change capture component as described with reference to FIGS. 6 through 8.

At 1140, the application server may write, to a log for exception handling, the at least one data record based on the identifying. The operations of 1140 may be performed according to the methods described herein. In some examples, aspects of the operations of 1140 may be performed by an exception handling component as described with reference to FIGS. 6 through 8.

Figure 12:
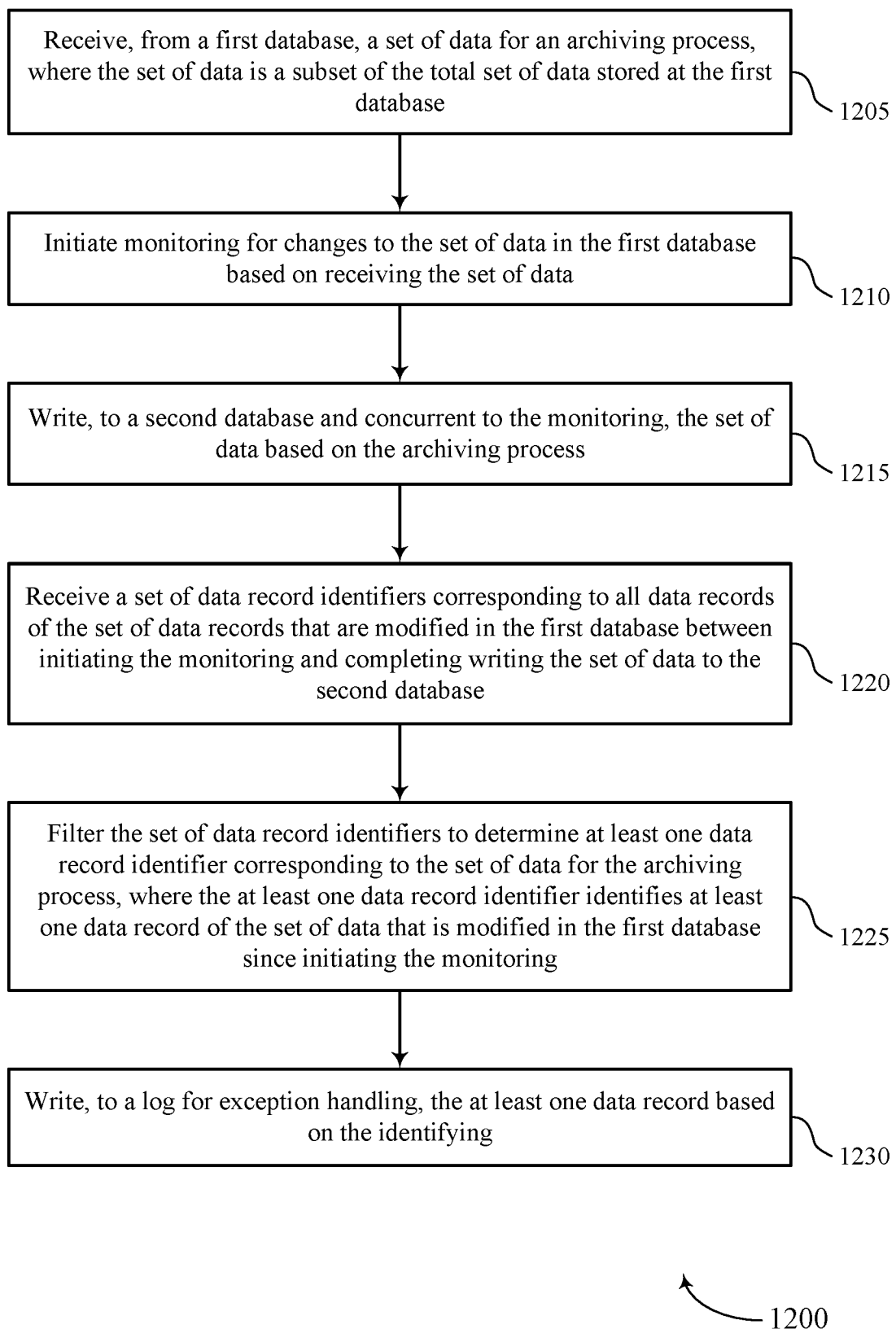

FIG. 12 shows a flowchart illustrating a method 1200 that supports LOCC in accordance with aspects of the present disclosure. The operations of method 1200 may be implemented by an application server or its components as described herein. For example, the operations of method 1200 may be performed by an archiving manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1205, the application server may receive, from a first database, a set of data for an archiving process. The first database may store a total set of data records, and the set of data may be a subset of the total set of data records stored at the first database. The operations of 1205 may be performed according to the methods described herein. In some examples, aspects of the operations of 1205 may be performed by a data reception component as described with reference to FIGS. 6 through 8.

At 1210, the application server may initiate monitoring for changes to the set of data in the first database based on receiving the set of data. The operations of 1210 may be performed according to the methods described herein. In some examples, aspects of the operations of 1210 may be performed by a monitoring component as described with reference to FIGS. 6 through 8.

At 1215, the application server may write, to a second database and concurrent to the monitoring, the set of data based on the archiving process. The operations of 1215 may be performed according to the methods described herein. In some examples, aspects of the operations of 1215 may be performed by a data writing component as described with reference to FIGS. 6 through 8.

At 1220, the application server may receive a set of data record identifiers corresponding to all data records of the total set of data records that are modified in the first database between initiating the monitoring and the completion of writing the set of data to the second database, where receiving the set of data record identifiers is based on the monitoring. The operations of 1220 may be performed according to the methods described herein. In some examples, aspects of the operations of 1220 may be performed by a filtering component as described with reference to FIGS. 6 through 8.

At 1225, the application server may filter the set of data record identifiers to determine at least one data record identifier corresponding to the set of data for the archiving process, where the at least one data record identifier identifies at least one data record of the set of data that is modified in the first database since initiating the monitoring. The operations of 1225 may be performed according to the methods described herein. In some examples, aspects of the operations of 1225 may be performed by a filtering component as described with reference to FIGS. 6 through 8.

At 1230, the application server may write, to a log for exception handling, the at least one data record identified as being modified in the first database since initiating the monitoring. The operations of 1230 may be performed according to the methods described herein. In some examples, aspects of the operations of 1230 may be performed by an exception handling component as described with reference to FIGS. 6 through 8.

A method for data archiving from a first database to a second database is described. The method may include receiving, from the first database, a set of data for an archiving process, initiating monitoring for changes to the set of data in the first database based on receiving the set of data, writing, to the second database and concurrent to the monitoring, the set of data based on the archiving process, identifying, after completion of writing the set of data to the second database and based on the monitoring, at least one data record of the set of data that is modified in the first database since initiating the monitoring, and writing, to a log for exception handling, the at least one data record based on the identifying.

An apparatus for data archiving from a first database to a second database is described. The apparatus may include a processor, memory coupled with the processor, and instructions stored in the memory. The instructions may be executable by the processor to cause the apparatus to receive, from the first database, a set of data for an archiving process, initiate monitoring for changes to the set of data in the first database based on receiving the set of data, write, to the second database and concurrent to the monitoring, the set of data based on the archiving process, identify, after completion of writing the set of data to the second database and based on the monitoring, at least one data record of the set of data that is modified in the first database since initiating the monitoring, and write, to a log for exception handling, the at least one data record based on the identifying.

Another apparatus for data archiving from a first database to a second database is described. The apparatus may include means for receiving, from the first database, a set of data for an archiving process, initiating monitoring for changes to the set of data in the first database based on receiving the set of data, writing, to the second database and concurrent to the monitoring, the set of data based on the archiving process, identifying, after completion of writing the set of data to the second database and based on the monitoring, at least one data record of the set of data that is modified in the first database since initiating the monitoring, and writing, to a log for exception handling, the at least one data record based on the identifying.

A non-transitory computer-readable medium storing code for data archiving from a first database to a second database is described. The code may include instructions executable by a processor to receive, from the first database, a set of data for an archiving process, initiate monitoring for changes to the set of data in the first database based on receiving the set of data, write, to the second database and concurrent to the monitoring, the set of data based on the archiving process, identify, after completion of writing the set of data to the second database and based on the monitoring, at least one data record of the set of data that is modified in the first database since initiating the monitoring, and write, to a log for exception handling, the at least one data record based on the identifying.

Some examples of the method, apparatuses, and non-transitory computer-readable medium described herein may further include operations, features, means, or instructions for executing a first worker thread, where executing the first worker thread includes receiving the set of data for the archiving process, writing the set of data to the second database, identifying the at least one data record that may be modified in the first database, and writing the at least one data record to the log, and executing a second worker thread concurrent to executing the first worker thread, where the second worker thread is different from the first worker thread and executing the second worker thread includes initiating the monitoring. Some examples of the method, apparatuses, and non-transitory computer-readable medium described herein may further include operations, features, means, or instructions for registering the second worker thread to a change event capture service of the first database, where the monitoring for changes to the set of data in the first database may be based on registering the second worker thread to the change event capture service.

Some examples of the method, apparatuses, and non-transitory computer-readable medium described herein may further include operations, features, means, or instructions for establishing, with the first database, a transaction-specific database connection for the archiving process, where the set of data may be received from the first database via the transaction-specific database connection, removing, from the first database, the transaction-specific database connection based on receiving the set of data for the archiving process, and subscribing to a shareable database connection for the first database, where the set of data in the first database may be monitored for changes based on subscribing to the shareable database connection.

In some examples of the method, apparatuses, and non-transitory computer-readable medium described herein, the archiving process corresponds to a first tenant owning the set of data, a first data entity corresponding to the set of data, or both, and one or more additional archiving processes subscribe to the shareable database connection for the first database, where the one or more additional archiving processes correspond to one or more additional tenants different from the first tenant, one or more additional data entities different from the first data entity, or both.

In some examples of the method, apparatuses, and non-transitory computer-readable medium described herein, the first database stores a set of data records, and the set of data for the archiving process is a subset of the set of data records.

In some examples of the method, apparatuses, and non-transitory computer-readable medium described herein, identifying the at least one data record that is modified in the first database further may include operations, features, means, or instructions for receiving a set of data record identifiers corresponding to all data records of the set of data records that are modified in the first database between initiating the monitoring and the completion of writing the set of data to the second database, where receiving the set of data record identifiers may be based on the monitoring, and filtering the set of data record identifiers to determine at least one data record identifier corresponding to the set of data for the archiving process, where the at least one data record identifier identifies the at least one data record that is modified in the first database.

Some examples of the method, apparatuses, and non-transitory computer-readable medium described herein may further include operations, features, means, or instructions for receiving, from a user device, a user input to the log for exception handling selecting the at least one data record for a second archiving process and rewriting, to the second database, the at least one data record based on the second archiving process. Some other examples of the method, apparatuses, and non-transitory computer-readable medium described herein may further include operations, features, means, or instructions for automatically selecting the at least one data record for a second archiving process based on a schedule and rewriting, to the second database, the at least one data record based on the second archiving process.

In some examples of the method, apparatuses, and non-transitory computer-readable medium described herein, the at least one data record may be a child data record for a parent data record. Some examples of the method, apparatuses, and non-transitory computer-readable medium described herein may further include operations, features, means, or instructions for writing, to the log for exception handling, the parent data record based on the child data record that is modified in the first database. Some examples of the method, apparatuses, and non-transitory computer-readable medium described herein may further include operations, features, means, or instructions for refraining from deleting, from the first database, the child data record and the parent data record based on the identifying and deleting, from the first database, the set of data for the archiving process except for the child data record and the parent data record based on writing the set of data to the second database and the refraining.

Some examples of the method, apparatuses, and non-transitory computer-readable medium described herein may further include operations, features, means, or instructions for refraining from deleting, from the first database, the at least one data record based on the identifying and deleting, from the first database, the set of data for the archiving process except for the at least one data record based on writing the set of data to the second database and the refraining.

In some examples of the method, apparatuses, and non-transitory computer-readable medium described herein, the set of data may be received from the first database via a first abstraction layer and the set of data may be written to the second database via a second abstraction layer. In some examples of the method, apparatuses, and non-transitory computer-readable medium described herein, the first database may be a relational database and the second database may be a non-relational database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data archiving from a first database to a second database, comprising:
    executing a first worker thread, wherein executing the first worker thread comprises receiving, from the first database, a set of data for an archiving process; and
    executing a second worker thread concurrent to executing the first worker thread, wherein the second worker thread is different from the first worker thread and executing the second worker thread comprises initiating monitoring for changes to the set of data in the first database based at least in part on receiving the set of data, and wherein executing the first worker thread further comprises:
        writing, to the second database and concurrent to the monitoring, the set of data based at least in part on the archiving process;
        identifying, after completion of writing the set of data to the second database and based at least in part on the monitoring, at least one data record of the set of data that is modified in the first database since initiating the monitoring; and
        writing, to a log for exception handling, the at least one data record based at least in part on the identifying.

2. The method of claim 1, further comprising:
    registering the second worker thread to a change event capture service of the first database, wherein the monitoring for changes to the set of data in the first database is based at least in part on registering the second worker thread to the change event capture service.

3. The method of claim 1, further comprising:
    establishing, with the first database, a transaction-specific database connection for the archiving process, wherein the set of data is received from the first database via the transaction-specific database connection;
    removing, from the first database, the transaction-specific database connection based at least in part on receiving the set of data for the archiving process; and
    subscribing to a shareable database connection for the first database, wherein the set of data in the first database is monitored for changes based at least in part on subscribing to the shareable database connection.

4. The method of claim 3, wherein:
    the archiving process corresponds to a first tenant owning the set of data, a first data entity corresponding to the set of data, or both; and
    one or more additional archiving processes subscribe to the shareable database connection for the first database, wherein the one or more additional archiving processes correspond to one or more additional tenants different from the first tenant, one or more additional data entities different from the first data entity, or both.

5. The method of claim 1, wherein:
    the first database stores a plurality of data records; and
    the set of data for the archiving process comprises a subset of the plurality of data records.

6. The method of claim 5, wherein identifying the at least one data record that is modified in the first database further comprises:
    receiving a set of data record identifiers corresponding to all data records of the plurality of data records that are modified in the first database between initiating the monitoring and the completion of writing the set of data to the second database, wherein receiving the set of data record identifiers is based at least in part on the monitoring; and
    filtering the set of data record identifiers to determine at least one data record identifier corresponding to the set of data for the archiving process, wherein the at least one data record identifier identifies the at least one data record that is modified in the first database.

7. The method of claim 1, further comprising:
    receiving, from a user device, a user input to the log for exception handling selecting the at least one data record for a second archiving process; and
    rewriting, to the second database, the at least one data record based at least in part on the second archiving process.

8. The method of claim 1, further comprising:
    automatically selecting the at least one data record for a second archiving process based at least in part on a schedule; and
    rewriting, to the second database, the at least one data record based at least in part on the second archiving process.

9. The method of claim 1, wherein the at least one data record comprises a child data record for a parent data record, the method further comprising:
    writing, to the log for exception handling, the parent data record based at least in part on the child data record that is modified in the first database.

10. The method of claim 9, further comprising:
    refraining from deleting, from the first database, the child data record and the parent data record based at least in part on the identifying; and
    deleting, from the first database, the set of data for the archiving process except for the child data record and the parent data record based at least in part on writing the set of data to the second database and the refraining.

11. The method of claim 1, further comprising:
refraining from deleting, from the first database, the at least one data record based at least in part on the identifying; and
deleting, from the first database, the set of data for the archiving process except for the at least one data record based at least in part on writing the set of data to the second database and the refraining.

12. The method of claim 1, wherein:
the set of data is received from the first database via a first abstraction layer; and
the set of data is written to the second database via a second abstraction layer.

13. The method of claim 1, wherein:
the first database comprises a relational database; and
the second database comprises a non-relational database.

14. An apparatus for data archiving from a first database to a second database, comprising:
a processor;
memory coupled with the processor; and
instructions stored in the memory and executable by the processor to cause the apparatus to:
execute a first worker thread, wherein the instructions to execute the first worker thread are executable by the processor to cause the apparatus to receive, from the first database, a set of data for an archiving process; and
execute a second worker thread concurrent to executing the first worker thread, wherein the second worker thread is different from the first worker thread and wherein the instructions to execute the second worker thread are executable by the processor to cause the apparatus to initiate monitoring for changes to the set of data in the first database based at least in part on receiving the set of data, and wherein the instructions to execute the first worker thread are further executable by the processor to cause the apparatus to:
write, to the second database and concurrent to the monitoring, the set of data based at least in part on the archiving process;
identify, after completion of writing the set of data to the second database and based at least in part on the monitoring, at least one data record of the set of data that is modified in the first database since initiating the monitoring; and
write, to a log for exception handling, the at least one data record based at least in part on the identifying.

15. The apparatus of claim 14, wherein the instructions are further executable by the processor to cause the apparatus to:

establish, with the first database, a transaction-specific database connection for the archiving process, wherein the set of data is received from the first database via the transaction-specific database connection;
remove, from the first database, the transaction-specific database connection based at least in part on receiving the set of data for the archiving process; and
subscribe to a shareable database connection for the first database, wherein the set of data in the first database is monitored for changes based at least in part on subscribing to the shareable database connection.

16. A non-transitory computer-readable medium storing code for data archiving from a first database to a second database, the code comprising instructions executable by a processor to:
execute a first worker thread, wherein the instructions for executing the first worker thread are executable to receive, from the first database, a set of data for an archiving process; and
execute a second worker thread concurrent to executing the first worker thread, wherein the second worker thread is different from the first worker thread and wherein the instructions for executing the second worker thread are executable to initiate monitoring for changes to the set of data in the first database based at least in part on receiving the set of data, and wherein the instructions for executing the first worker thread are further executable to:
write, to the second database and concurrent to the monitoring, the set of data based at least in part on the archiving process;
identify, after completion of writing the set of data to the second database and based at least in part on the monitoring, at least one data record of the set of data that is modified in the first database since initiating the monitoring; and
write, to a log for exception handling, the at least one data record based at least in part on the identifying.

17. The non-transitory computer-readable medium of claim 16, wherein the instructions are further executable to:
establish, with the first database, a transaction-specific database connection for the archiving process, wherein the set of data is received from the first database via the transaction-specific database connection;
remove, from the first database, the transaction-specific database connection based at least in part on receiving the set of data for the archiving process; and
subscribe to a shareable database connection for the first database, wherein the set of data in the first database is monitored for changes based at least in part on subscribing to the shareable database connection.

\* \* \* \* \*